United States Patent
Hill (10) Patent No.: US 7,332,846 B2
(45) Date of Patent: Feb. 19, 2008

(54) DAMPING DEVICE

(75) Inventor: Wolfgang Hill, Karlsruhe (DE)

(73) Assignee: LuK Lamellen Kupplungsbau Beteiligungs KG, Buehl (DE)

( * ) Notice: Subject to any disclaimer, the term of this patent is extended or adjusted under 35 U.S.C. 154(b) by 437 days.

(21) Appl. No.: 11/005,752

(22) Filed: Dec. 6, 2004

(65) Prior Publication Data

US 2005/0134415 A1    Jun. 23, 2005

(30) Foreign Application Priority Data

Dec. 12, 2003 (DE) ................. 103 58 113

(51) Int. Cl.
*H02K 1/22* (2006.01)
(52) U.S. Cl. ................. 310/266; 310/51; 310/30
(58) Field of Classification Search .......... 310/266, 310/30, 51, 166

See application file for complete search history.

(56) References Cited

U.S. PATENT DOCUMENTS

| | | | | |
|---|---|---|---|---|
| 3,637,169 A | * | 1/1972 | Tossman et al. | 244/170 |
| 3,806,062 A | * | 4/1974 | Hofmann et al. | 244/170 |
| 3,991,284 A | * | 11/1976 | Braun | 369/139 |
| 4,233,476 A | * | 11/1980 | Ikeda | 369/139 |
| 4,385,375 A | * | 5/1983 | Okura et al. | 369/139 |
| 4,825,983 A | * | 5/1989 | Nakanishi | 188/378 |
| 5,285,995 A | * | 2/1994 | Gonzalez et al. | 248/550 |
| 5,642,249 A | * | 6/1997 | Kuznetsov | 361/58 |
| 5,973,436 A | * | 10/1999 | Mitcham | 310/266 |
| 6,504,272 B2 | * | 1/2003 | Sakamoto | 310/49 R |
| 2002/0175586 A1 | * | 11/2002 | Hill | 310/179 |
| 2005/0134415 A1 | * | 6/2005 | Hill | 335/220 |

FOREIGN PATENT DOCUMENTS

DE    102004055163    * 7/2005

* cited by examiner

*Primary Examiner*—Dang Le
*Assistant Examiner*—Nguyen N. Hanh
(74) *Attorney, Agent, or Firm*—Davidson, Davidson & Kappel

(57) ABSTRACT

A damping device for damping speed irregularities of a rotating shaft includes an armature having at least one armature part made of a non-ferromagnetic, electrically conductive material. An exciter configured to permeate the armature part in at least some regions with a magnetic flux. The armature, together with the at least one armature part, is movably supported relative to the exciter, transversely to the direction of the magnetic flux. In one region permeated by the magnetic flux in a position of normal use, the armature part has at least one opening in which a ferromagnetic flux-guide member is located.

21 Claims, 8 Drawing Sheets

DAMPING DEVICE

Priority is claimed to German Patent Application No. DE 103 58 113.8, filed on Dec. 12, 2003, the entire disclosure of which is incorporated by reference herein.

The present invention is directed to a damping device for damping the speed irregularities of a rotating shaft, having an armature, which has at least one armature part made of a non-ferromagnetic, electrically conductive material, and having an exciter for permeating the armature part in some regions with a magnetic flux, the armature having at least one armature part being movably supported relative to the exciter, transversely to the direction of the magnetic flux.

BACKGROUND

A damping device of this kind having an armature, which is designed as a disk-shaped rotor and which has an annular disk-shaped armature part of aluminum, is known in the field. The armature part is mounted on a rotating shaft which, under certain operating conditions, exhibits speed fluctuations caused by spurious oscillations. In response to the occurrence of such speed fluctuations, a direct current is fed with the aid of a control device into a winding of the exciter in order to induce a magnetic flux in a soft magnetic core of the exciter that permeates a partial region of the armature part which is radially spaced apart from the shaft's axis of rotation and is located between the teeth of the soft magnetic core. In this context, the direction of rotation of the armature part is oriented transversely to the magnetic flux that permeates it, so that electric currents are induced in the partial region of the armature part permeated by the magnetic flux. These electric currents produce heat losses in the armature part which damp the spurious oscillations. The damping device still has the disadvantage, however, of having sizable dimensions and only a relatively negligible damping moment. Therefore, for all intents and purposes, the damping device is not well suited for damping spurious oscillations occurring on the drive shaft of an automotive combustion engine.

SUMMARY OF THE INVENTION

An object of the present invention is to provide a damping device of the type mentioned at the outset which will render possible a substantial damping moment while working with compact dimensions.

The present invention provide a damping device having an armature part having an opening in at least in one region permeated by a magnetic flux in a position of normal use, a ferromagnetic flux-guide member being disposed in the opening.

The magnetic resistance between the teeth of the soft magnetic member is advantageously substantially reduced by the at least one flux-guide member as compared to the damping device known from the related art in which the conductor part is made exclusively of an electrically highly conductive, non-ferromagnetic material. As a result, given equivalent dimensions of the damping device, it is possible to produce a substantially greater magnetic flux in the magnetic circuit made up of the soft magnetic core, at least one air gap situated between this core and the armature, the at least one flux-guide member, and the armature part, so that a correspondingly high electrical voltage is also induced in the armature part. Since this voltage is virtually short-circuited across the conductor material, which, in comparison to the material of the at least one ferromagnetic flux-guide member, may have a substantially greater electrical conductivity, the damping device makes possible a correspondingly high damping moment. This makes it advantageously possible to install the damping device in a clutch bell of a manually operated transmission, for example, in order to actively damp spurious oscillations occurring on the drive shaft of an automotive combustion engine. In the process, the intensity of the current used to energize the winding of the exciter may be adjusted by a control device as a function of the operating state of the combustion engine. The amplitude of the spurious oscillations, the speed of the drive shaft, and/or the torque of the combustion engine may be ascertained, for example, as state variables for the operating state.

The armature of the damping device is similar in construction to the armature of an induction machine, the armature not having any yoke, however.

It is beneficial when the armature part has a plurality of openings which are spaced apart from one another in the circumferential direction and in each of which a ferromagnetic flux-guide member is located. An even greater damping moment may then be produced by the damping device.

In one useful embodiment of the present invention, the exciter has a soft magnetic core, which has at least two teeth that are joined to one another by a yoke and that cooperate via at least one air gap with the armature part, at least one winding for inducing a magnetic flux in the core being situated on the core, the armature part having at least one annular disk-shaped region having at least one flat side and facing the teeth, and the openings being disposed in the annular disk-shaped region. The eddy currents are then induced in the armature part at the location that is spaced apart from the armature's axis of rotation, so that a correspondingly high damping moment is obtained. The relatively expensive conductor material is preferably accommodated only in the annular disk-shaped region, thereby making possible a cost-effective design of the damping device. Copper and/or aluminum are preferably used as a conductor material.

It is advantageous for the teeth to be positioned on both sides of the armature part in the axial direction thereof, and for the openings to be formed as wall cutouts. The result, on the one hand, is that an especially low magnetic resistance is produced in the magnetic circuit and, on the other hand, that the armature part and the flux-guide members may be advantageously fabricated as stamped parts or as combination bent and stamped parts.

One practical specific embodiment of the present invention provides for the ferromagnetic flux-guide members to preferably protrude from the openings on both sides of the armature part, at least two of the flux-guide members being expediently formed by teeth of a soft magnetic element which preferably has an annular or annular sectional form. The armature may then be fabricated inexpensively from a few easily assembled individual parts.

It is beneficial when the openings are spaced apart from the radially inner and/or outer periphery of the annular disk-shaped region. The currents induced by the magnetic flux in the rotating armature may then flow around the individual flux-guide members in the plane of extension of the disk-shaped armature, thereby making possible high ring currents and thus substantial damping.

The openings preferably have an elongated cross-sectional form, which is disposed with its longitudinal axis transversely to the circumferential direction of the armature part and preferably more or less radially to its axis of rotation. Thus, a multiplicity of flux-guide members may be configured side-by-side in the circumferential direction of the armature part, thereby making possible a uniform damping moment. The teeth of the soft magnetic core preferably extend in each case over a plurality of flux-guide members at the same time. At their ends facing the armature part, the teeth are formed in such a way that the flux enters in a highly concentrated manner into the air gap, without any significant cross-sectional narrowing in the soft magnetic member.

In one preferred specific embodiment of the present invention, the radially inner and/or outer peripheral region of the armature part is preferably bent or angled in a collar shape relative to the plane of extension of the annular disk-shaped region. This enables the region of the armature part that produces the damping torque to be situated at a relatively substantial distance, which renders possible a higher performance density. In addition, the ratio of damping moment to moment of inertia is improved in that the conductor material is accommodated on a small radius. Nevertheless, a substantially uniform current density results in the conductor material.

It is especially beneficial for the armature to have at least two of the annular disk-shaped regions, which are joined to one another, disposed in preferably mutually parallel surfaces, and spaced apart from one another in the direction of the magnetic flux in the air gap; for the soft magnetic core to have at least three teeth; and preferably for at least one of the teeth to engage in an interspace formed between the annular disk-shaped regions in order to permeate both annular disk-shaped regions with the magnetic flux. This makes it possible for the damping device to produce an even greater damping moment. Since the tooth of the soft magnetic core located in the interspace between the annular disk-shaped regions may be used for magnetically permeating both annular disk-shaped regions, the damping device has exceptionally compact dimensions. The length per turn of the coil producing the magnetic field is small, so that few unwanted losses occur in the stator.

In one particularly advantageous specific embodiment of the present invention, the soft magnetic core has at least one claw-pole segment, which has a plurality of teeth that are spaced apart in the circumferential direction of the armature part. As a result of this measure as well, a very substantial damping moment may be achieved. Teeth having different magnetic polarity preferably alternate with one another in the circumferential direction of the armature, so that the individual regions of the armature part are alternately magnetized in mutually opposing directions in response to a relative motion between the armature part and the exciter. The change in flux in the flux-guide elements takes place at twice the rate and at a high frequency and induces substantial circulating currents in the armature, the armature losses being proportional to the braking force.

Preferably at least two of the exciters are staggered relative to each other in the circumferential direction of the armature part. In this specific embodiment as well, the teeth are preferably configured in such a way that magnetic north and south poles alternate with one another in the circumferential direction of the armature part.

Depending on the available space, the winding may be placed on the yoke and/or at least on one tooth.

BRIEF DESCRIPTION OF THE DRAWINGS

Exemplary embodiments of the present invention are explained in greater detail in the following with reference to the drawing, whose figures show.

DETAILED DESCRIPTION

A damping device designated as a whole by 1, for damping the speed irregularities of a shaft that rotates around an axis of rotation 2, has an armature 3 that is operatively connected to the shaft, and at least one stationary exciter 4. Exciter 4 has a soft magnetic core 5 and a winding 6 accommodated thereon and set with a resin. To induce a magnetic flux in core 5, winding 6 is connected to a control device 7, which is used for feeding a direct current into winding 6.

Figure 1:
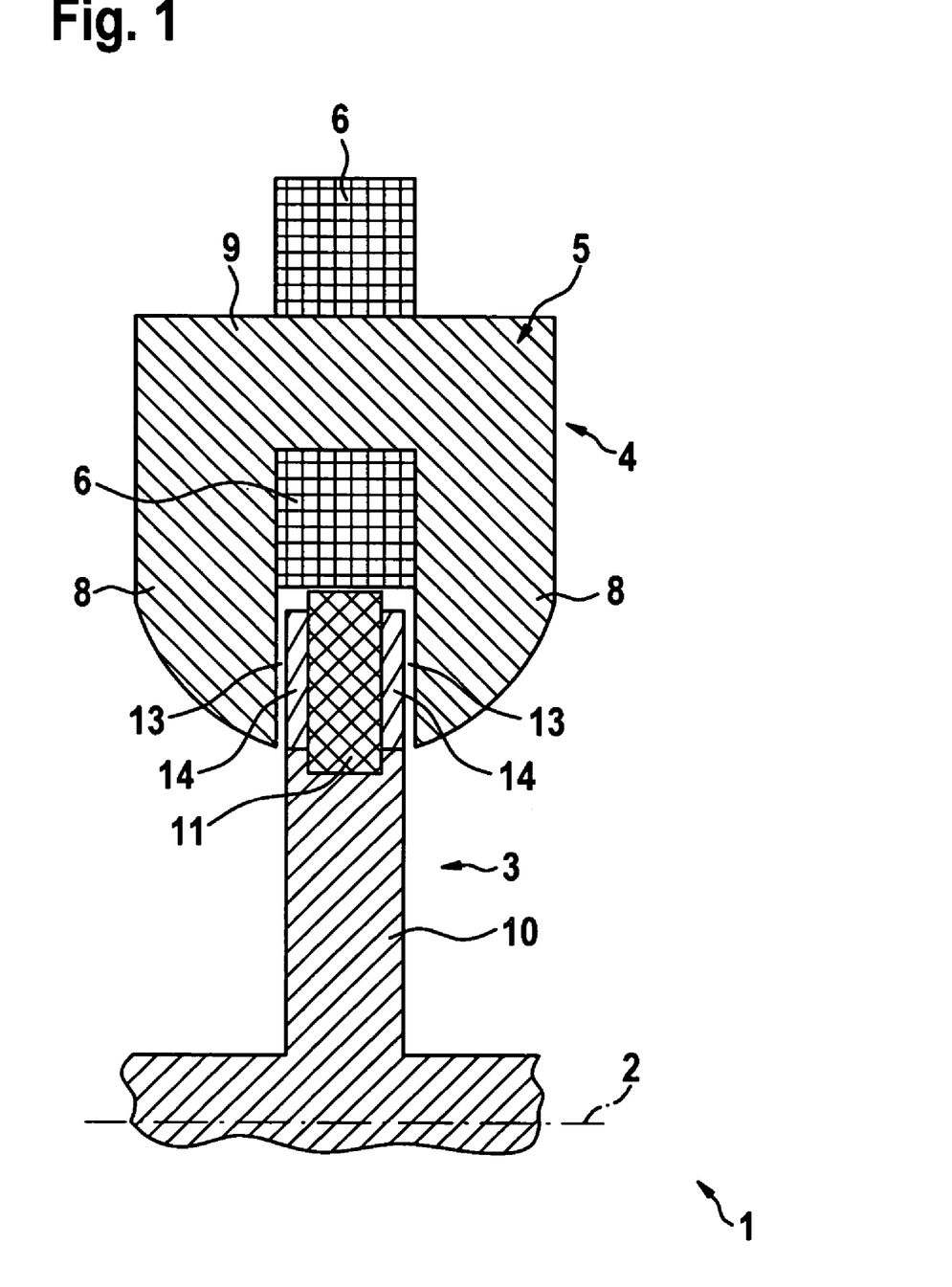
FIG. 1: a partial cross-section through a damping device having an armature, an exciter including a soft magnetic U-shaped core, and a winding, the winding being accommodated on a yoke region of the soft magnetic core.
Figure 2:
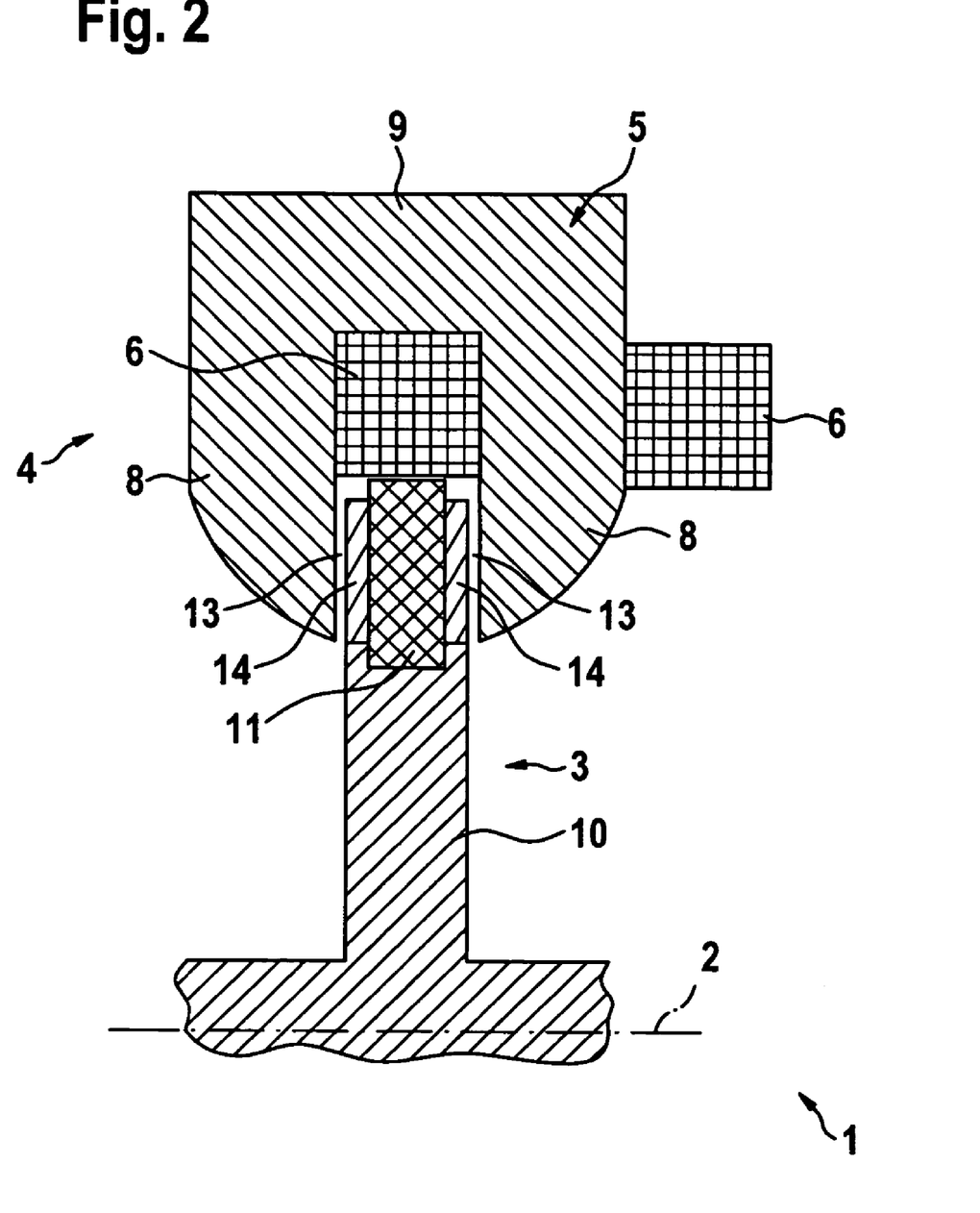
FIG. 2: a representation similar to that of FIG. 1, the winding being accommodated, however, on a tooth of the soft magnetic core.
Figure 3:
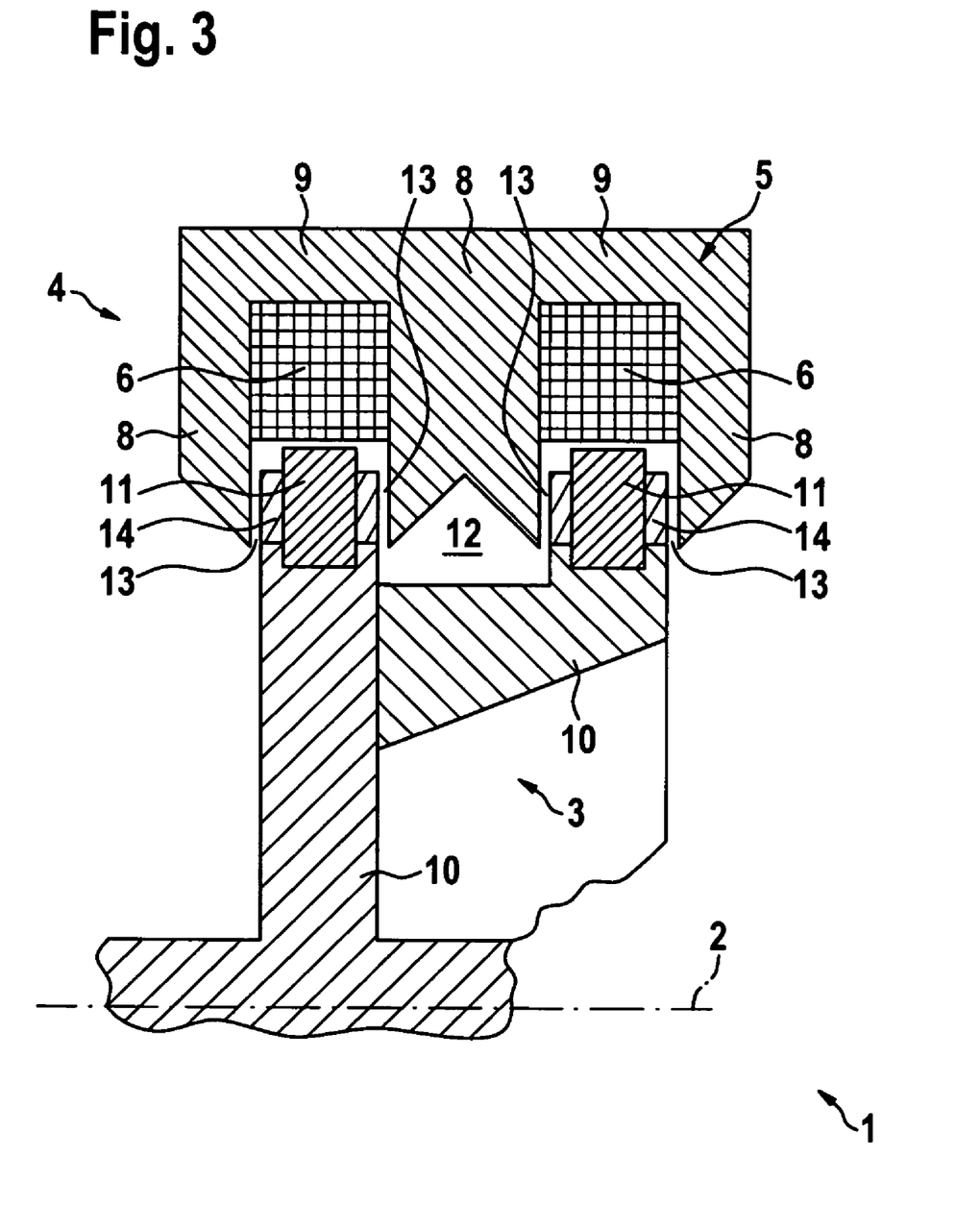
FIG. 3: a partial cross-section through a damping device which has an E-shaped soft magnetic core, the winding being accommodated on the middle tooth of the core.

In the exemplary embodiments shown in FIGS. 1 and 2, soft magnetic core 5 has two teeth 8 which are joined to one another approximately in a U-shape by a yoke 9. Winding 6 is wound around yoke 9 in the exemplary embodiment according to FIG. 1 and around one of teeth 8 in the exemplary embodiment according to FIG. 2. In the exemplary embodiment shown in FIG. 3, soft magnetic core 5 has three teeth 8 which are joined to one another approximately in an E-shape by yoke 9. Winding 6 is wound around middle tooth 8 in this exemplary embodiment.

In the exemplary embodiments according to FIGS. 1 and 2, armature 3 is formed more or less in a circular disk shape having a supporting part 10 connected to the shaft and an annular disk-shaped armature part 11 accommodated thereon concentrically to axis of rotation 2. Supporting part 10 is preferably made of a non-magnetic metal and/or plastic, and armature part 11 of a non-ferromagnetic, electrically conductive material, for example copper and/or aluminum. In the exemplary embodiments according to FIGS. 3 through 7, two annular armature parts 11, which run concentrically to axis of rotation 2 and each have an annular disk-shaped region, are accommodated on supporting part 10. The annular disk-shaped regions of armature parts 11 run in parallel with one another, as well as concentrically to axis of rotation 2, and are axially spaced apart from one another by an interspace 12.

It is discernible in FIGS. 1 through 4 and 6 that armature parts 11 each engage between teeth 8 and that a narrow air gap 13 is formed between armature parts 11 and teeth 8 facing each of them. In FIGS. 4 through 7, it is discernible that teeth 8 become axially narrower and tangentially wider at each of their ends facing armature parts 11. When winding 6 carries an electric current, the tooth ends located on both sides of armature parts 11 form magnetic poles of different polarity. In a position of normal use, the annular disk-shaped regions of armature parts 11 are situated between the ends of teeth 8. In the exemplary embodiments illustrated in FIGS. 4 through 7, the end of middle tooth 8 is located in the interspace 12 between the two armature parts 11.

Teeth 8 cooperate via air gaps 13 with armature parts 11 in such a way that their annular disk-shaped regions are permeated in some regions by the magnetic flux of soft magnetic core 5. In this context, the magnetic flux is aligned in the air gaps more or less in parallel with axis of rotation 2 of armature 3. Thus, the rotational motion of armature parts 11 is such that they move more or less at right angles to the direction of the magnetic flux.

Figure 5:
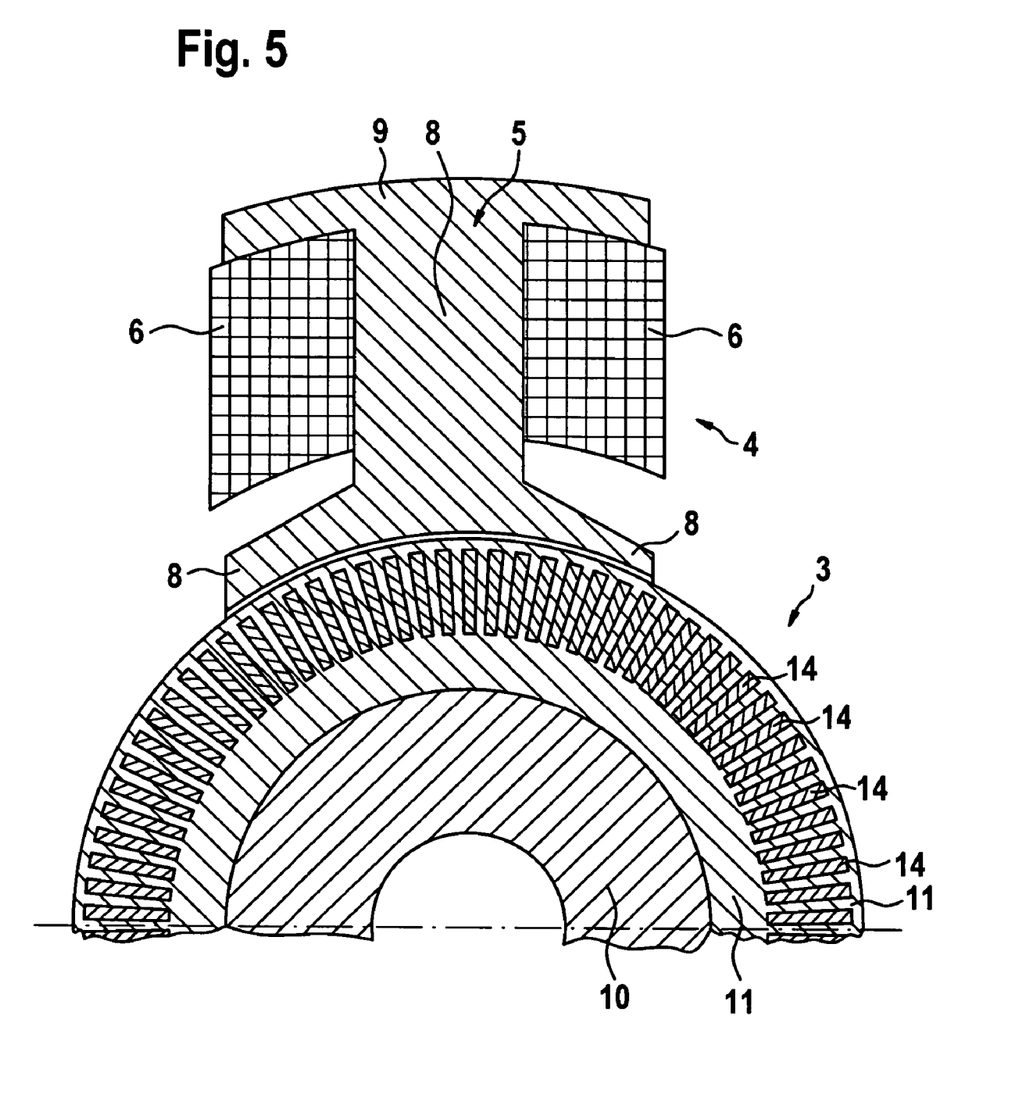
FIG. 5: a partial cross-section along a radial plane of the damping device illustrated in FIG. 4.
Figure 6:
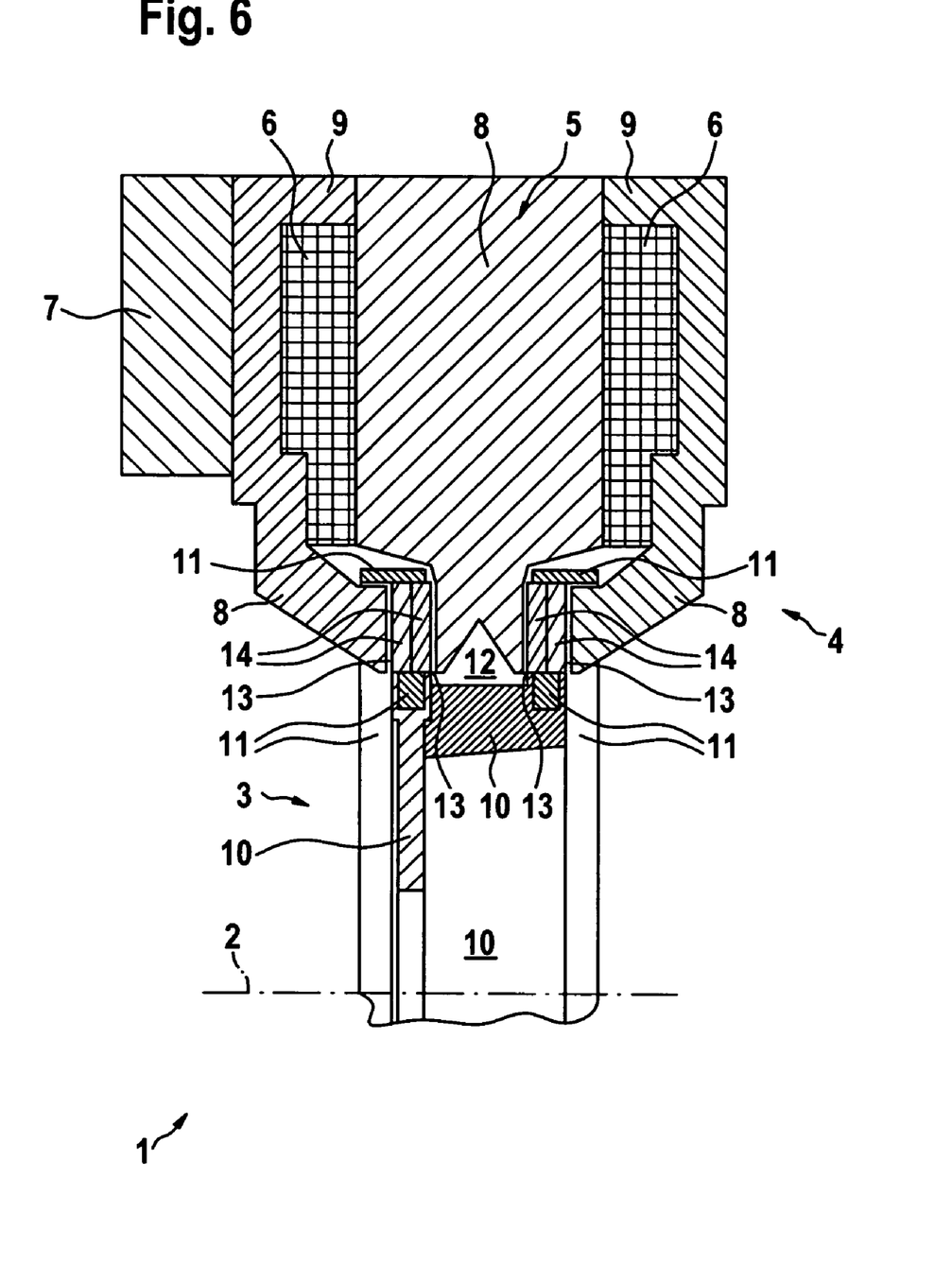
FIG. 6: a partial longitudinal section through a damping device having two exciters which are spaced apart in the circumferential direction of the armature.
Figure 7:
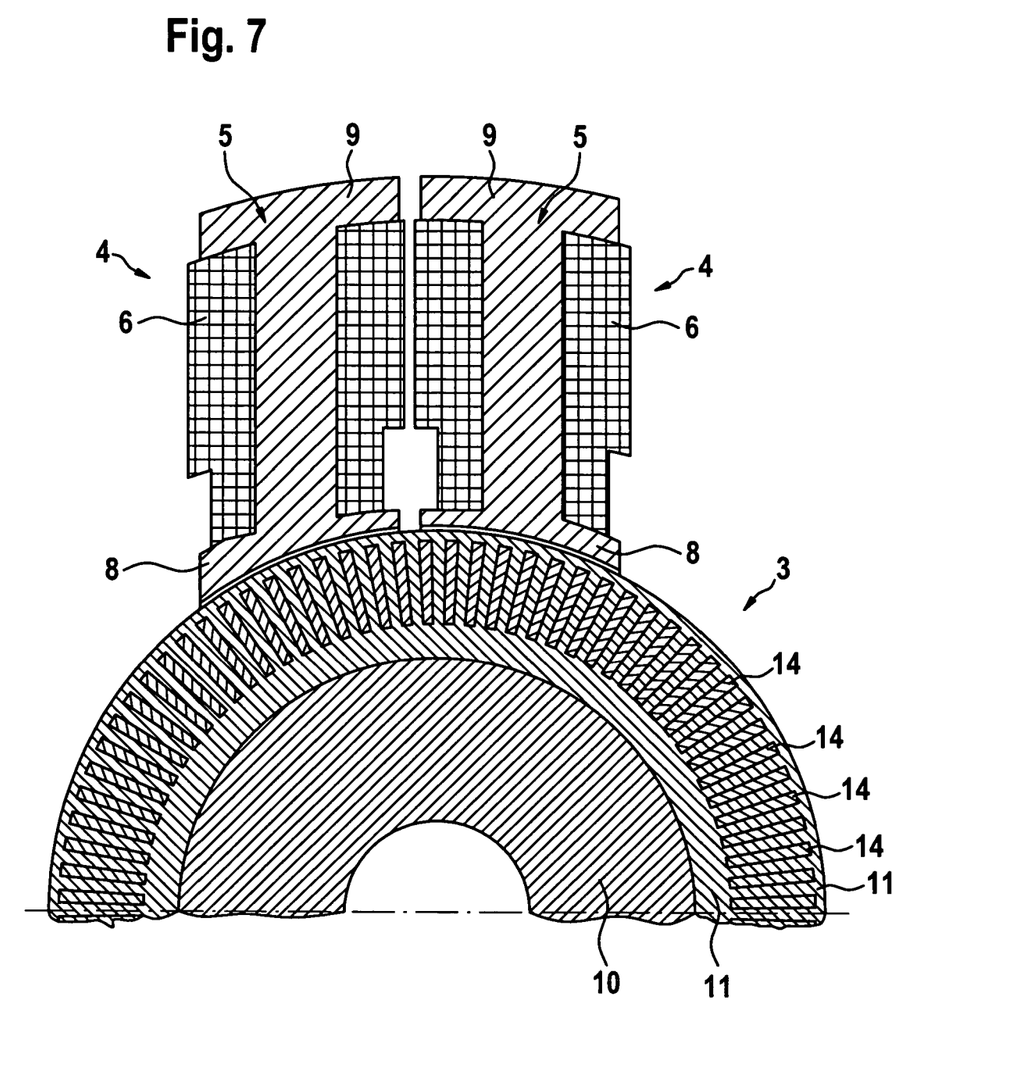
FIG. 7: a partial cross-section through a radial plane of the damping device illustrated in FIG. 6.

As is especially evident in FIGS. 5 through 7, armature parts 11 in the annular regions have a multiplicity of openings, which are spaced apart from one another, arranged one behind the other in the circumferential direction of armature part 11, and formed as wall cutouts. A ferromagnetic flux-guide member 14 extends through each of the wall cutouts more or less in parallel with the magnetic flux direction in air gaps 13. The cross section of flux-guide members 14 corresponds approximately to the cross section of the openings. It is discernible in FIGS. 5 and 7 that the openings and flux-guide members 14 each have an elongated, more or less rectangular or trapezoidal form and are arranged with their longitudinal axis approximately radially with respect to axis of rotation 2.

Figure 4:
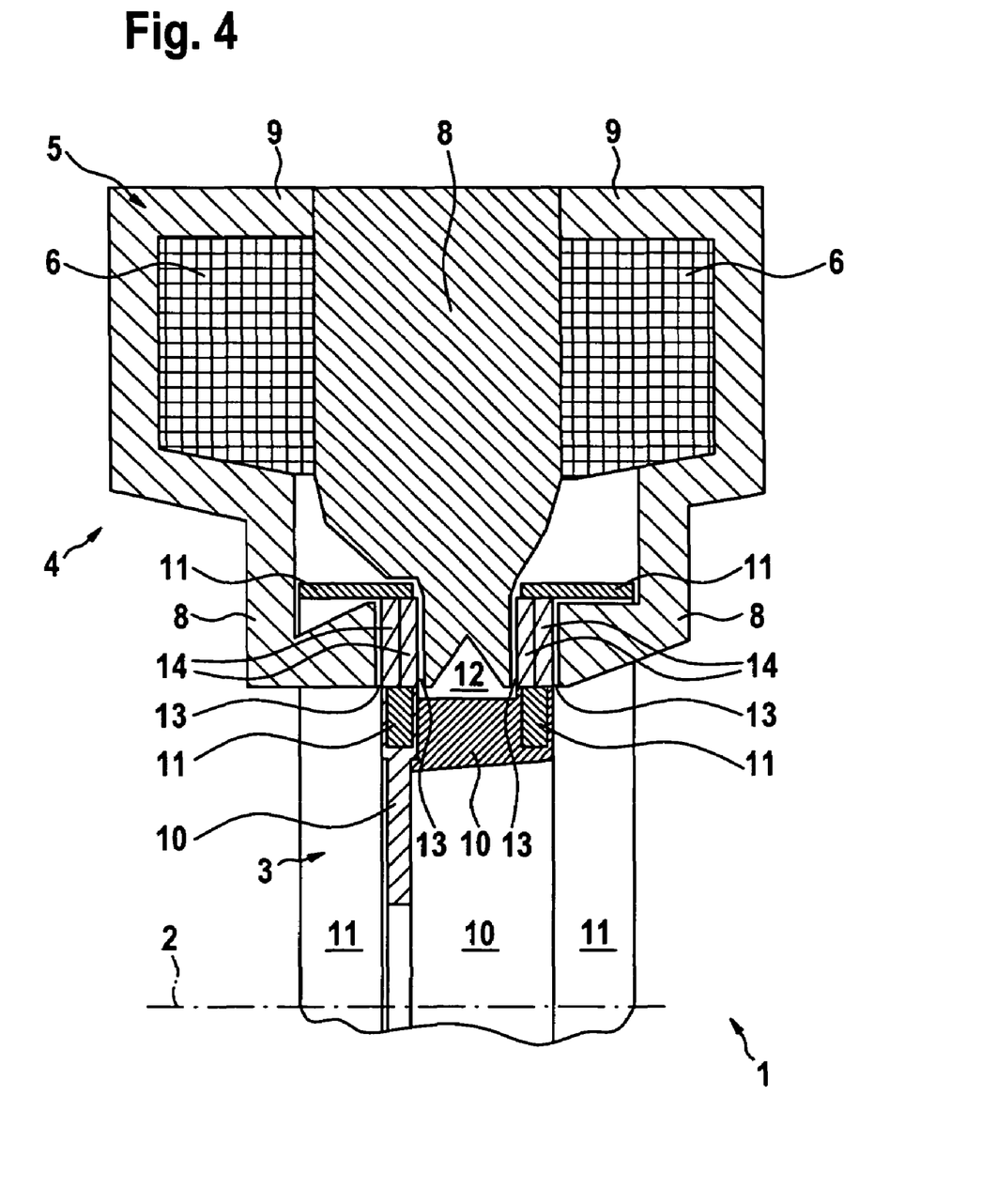
FIG. 4: a partial longitudinal section through a damping device.

It is discernible in FIGS. 4 and 5 that flux-guide members 14 project out of the openings and protrude with their ends somewhat beyond the adjacent flat-side surface planes of armature parts 11 in the direction of teeth 8. In this context, flux-guide members 14 are formed by teeth of two annular, toothed, soft magnetic elements accommodated on both sides of armature part 11. The soft magnetic elements have identical designs and are arranged in such a way that the teeth of the one soft magnetic element are offset and spaced apart from the teeth of the other soft magnetic element. The magnetic resistance of armature 3 is reduced in the area of armature part 11 by flux-guide members 14, with the result that the magnetic flux in the soft magnetic core and armature part 11 increases accordingly. Flux-guide members 14 are preferably made of iron or nickel.

As is especially evident in FIGS. 5 through 7, the openings are each spaced apart both from the radially inner as well as from the radially outer periphery of the annular disk-shaped region of armature part 11. This enables the electric currents induced by the magnetic flux in armature part 11 to flow in the plane of extension of the annular disk-shaped region and thus in each case over the shortest path around flux-guide members 14.

In FIGS. 4 and 6, it is discernible that the radially outer peripheral region of each armature part 11 is angled in a collar shape relative to the plane of extension of its annular disk-shaped region by about 90° with respect to the outer teeth 8 of soft magnetic core 5. In this context, the pole shoe of outer tooth 8 assigned in each case to armature part 11 in question grips behind the collar-shaped peripheral region of armature part 11 on the inside. The diameter of armature parts 11 is thereby reduced accordingly. Nevertheless, an adequate conductor cross section for the current flow is provided on the periphery of armature part 11. The cross section of the annular region of armature part 11 located between the radially inner periphery of armature part 11 and the radially inner ends of flux-guide members 14 corresponds approximately to the cross section of the ring region of armature part 11 located between the radially outer ends of flux-guide members 14 and the outer periphery of armature part 11.

In the exemplary embodiment according to FIG. 4, middle tooth 8 of soft magnetic core 5 is formed asymmetrically with respect to a center plane that runs normally to axis of rotation 2 and that is positioned in the middle between the planes of extension of the annular disk-shaped regions of both armature parts 11. It is clearly evident that the part of middle tooth 8 located on the one side of this center plane is larger in width in the axial direction of armature 3 than is the part of tooth 8 located on the other side of the center plane. The two outer teeth 8 of soft magnetic core 5 are also designed to be asymmetrical with respect to this center plane. This measure makes it possible for the dimensions of the damping device to be adapted to an existing space which may be located in a clutch bell of a clutch for a manually operated transmission. Of course, soft magnetic core 5 may also be designed to be symmetrical with respect to the mentioned center plane, as shown in the exemplary embodiment according to FIG. 6.

In the exemplary embodiment according to FIGS. 6 and 7, damping device 1 has two exciters 4, whose soft magnetic cores 5 are arranged one behind the other in the circumferential direction of armature 3 and are spaced apart from one another by an interspace. Windings 6 of exciters 4 are energized by the control device in such a way that pole shoes having different magnetic polarity alternate with one another in the circumferential direction of armature 3. As a result, when one segment of armature 3 moves past the pole shoes, a greatest possible change in the magnetic flux is achieved in the segment and thus a correspondingly large damping moment.

Figure 8:
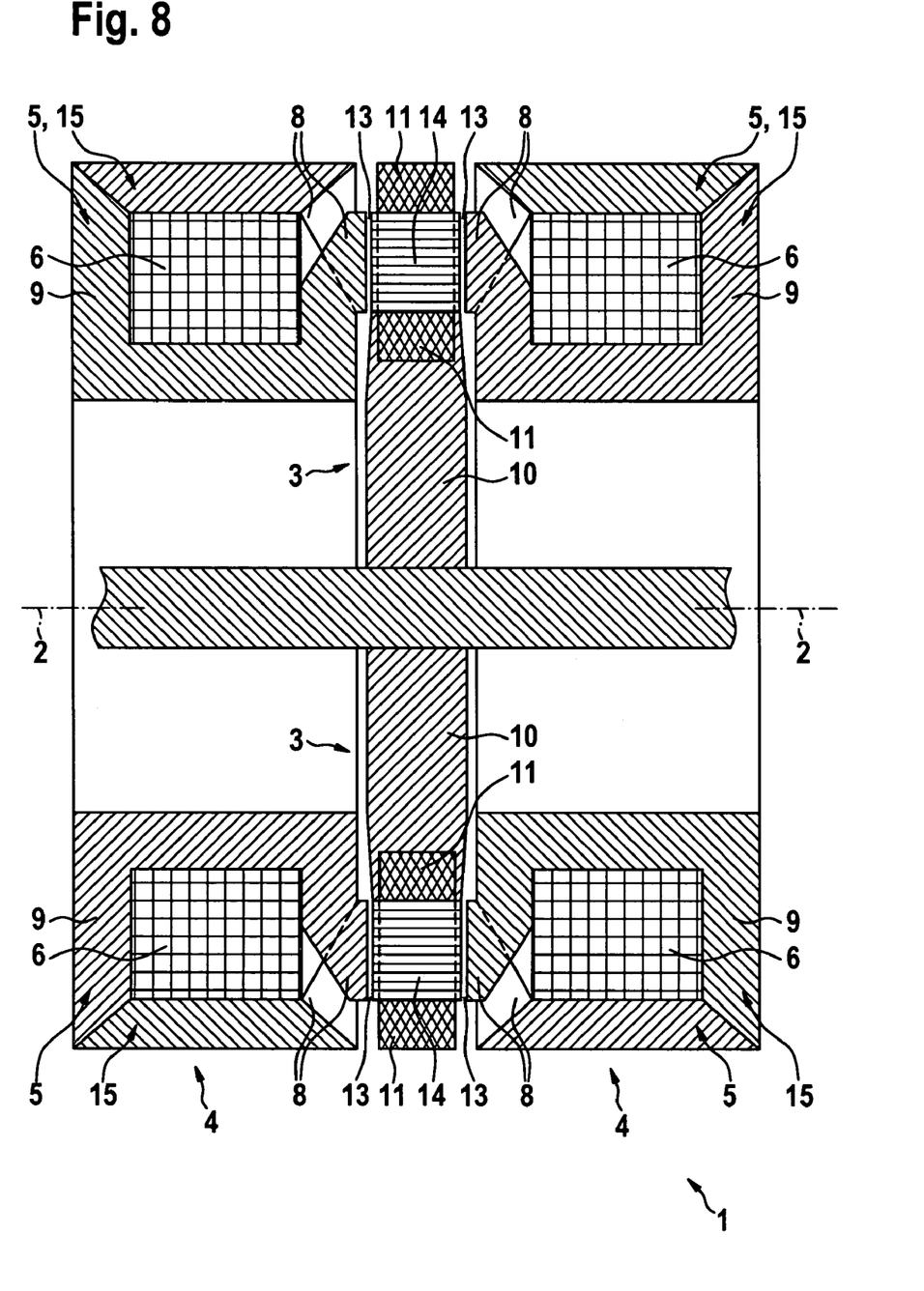
FIG. 8: a longitudinal section through a damping device whose soft magnetic core has claw-pole bodies.

In the exemplary embodiment shown in FIG. 8, soft magnetic core 5 has claw-pole bodies 15, which each have a plurality of teeth 8 that are spaced apart in the circumferential direction of armature part 11. Claw-pole bodies 15 are each composed of two magneto-conductively interconnected combination bent and stamped parts, of which one is positioned radially to the inside and the other radially to the outside.

Assigned to each claw-pole body 15 is a winding 6, which is accommodated in an annular receptacle of claw-pole body 15 in question more or less coaxially to axis of rotation 2. The magnetic flux around windings 6 is directed in each case through both combination bent and stamped parts of claw-pole bodies 15 embracing winding 6. Teeth 8 of individual claw-pole bodies 15 that follow one another mutually adjacently in the circumferential direction alternately form magnetic north and south poles. The assemblies accommodated on both sides of armature part 11 and composed of claw-pole body 15 and winding 6 are identical in design. The design of armature 3 corresponds substantially to the design of armature 3 shown in FIGS. 1 and 2.

Windings 6 are energized in mutually opposing directions in such a way that, axially opposing each tooth 8 having a magnetic north pole of the one claw-pole body 15 is a tooth 8 having a magentic south pole of the other claw-pole body 15. Flux-guide members 14 are positioned in the interspaces between the conjugate teeth 8 of the two claw-pole members. An air gap 13 is formed in each case between teeth 8 and flux-guide members 14 opposing the same.

A direct current, which is regulated or controlled as a function of the particular desired damping moment, is fed into windings 6.

It suffices for the functioning of the damping element when only one claw-pole member having one excitation coil is arranged on one side of the armature disk; on the opposite side, merely one magnetic return yoke of soft magnetic material is required. Alternatively to the axial flux guidance in the air gaps, designs which provide for radial flux direction in the air gaps may also be implemented in accordance with the design approach of the present invention. In addition, the armature may also be moved linearly, since the change in flux and thus the damping effect are independent of the direction of motion.

In the exemplary embodiments illustrated in the drawing, the magnetic flux permeates air gaps 13 axially with respect to armature 3. It is also conceivable, however, that the magnetic flux permeates air gap 13 radially.

What is claimed is:

1. A damping device for damping a speed irregularity of a rotating shaft, the damping device comprising:
   an armature in operative connection with the shaft and having an armature part, the armature part made of a non-ferromagnetic, electrically conductive material and defining an opening in a circumferential direction;
   an exciter configured to permeate a region of the armature part with a magnetic flux, wherein the armature is supported relative to the exciter so as to be moveable transversely to a direction of the magnetic flux; and
   a ferromagnetic flux-guide member disposed in an opening.

2. The damping device as recited in claim 1, wherein the armature part defines a plurality of further openings spaced apart from one another in a circumferential direction of the shaft and further comprising a plurality of further ferromagnetic flux-guide members, each disposed in a respective one of the plurality of further openings.

3. The damping device as recited in claim 1, wherein the exciter includes:
   a soft magnetic core having at least two teeth joined to one another by a yoke, wherein the teeth cooperate via at least one air gap with the armature part; and
   at least one winding disposed on the core and configured to induce the magnetic flux in the core, and wherein the region of the armature part is an annular disk-shaped region having at least one flat side facing one of the at least two teeth, the opening being disposed in the annular disk-shaped region.

4. The damping device as recited in claim 3, wherein the armature part has two axially facing sides each facing one of the at least two teeth, and wherein the openings are formed as wall cutouts.

5. The damping device as recited in claim 4, wherein the ferromagnetic flux-guide member protrudes from the openings on both of the two sides of the armature part.

6. The damping device as recited in claim 2, wherein at least two of the further flux-guide members are formed by teeth of a soft magnetic element.

7. The damping device as recited in claim 6, wherein the soft magnetic element has one of an annular and an annular sectional form.

8. The damping device as recited in claim 3, wherein each of the plurality of further openings are disposed at a distance from at least one of a radially inner and a radially outer periphery of the annular disk-shaped region.

9. The damping device as recited in claim 2, wherein each of the further openings have an elongated cross-sectional form and disposed with a longitudinal opening axis transverse to a circumferential direction of the armature part.

10. The damping device as recited in claim 9, wherein each of the further openings are disposed with the longitudinal opening axis substantially radial to an axis of rotation of the shaft.

11. The damping device as recited in claim 3, wherein the armature part includes a collar-shaped portion disposed at at least one of a radially inner and a radially outer periphery of the annular disk-shaped region.

12. The damping device as recited in claim 3, wherein the armature includes at least two armature parts disposed mutually parallel and spaced apart with respect to one another in the direction of the magnetic flux in the air gap and wherein the soft magnetic core has at least three teeth.

13. The damping device as recited in claim 12, wherein at least one of the at least three teeth engages in an interspace formed between the at least two armature parts so as to permeate both armature parts with the magnetic flux.

14. The damping device as recited in claim 3, wherein the soft magnetic core has at least one claw-pole body having a plurality of teeth spaced apart in a circumferential direction of the armature part.

15. The damping device as recited in claim 1, further comprising a further exciter staggered relative to the exciter in a circumferential direction of the armature part.

16. The damping device as recited in claim 3, wherein the winding is disposed on the yoke.

17. The damping device as recited in claim 3, wherein the winding is disposed on at least one of the teeth.

18. The damping device as recited in claim 3, wherein the teeth of the soft magnetic core and the ferromagnetic flux-guide members are positioned in relation to each other in such a way that the magnetic flux permeates the at least one air gap axially with respect to the armature.

19. The damping device as recited in claim 3, wherein the teeth of the soft magnetic core and the ferromagnetic flux-guide members are positioned in relation to each other in such a way that the magnetic flux permeates the at least one air gap radially with respect to the armature.

20. The damping device as recited in claim 1 wherein the opening is in rectangular or trapezoidal form.

21. The damping device as recited in claim 1 further comprising a supporting part, and the armature part extending radially past the supporting part.

* * * * *

UNITED STATES PATENT AND TRADEMARK OFFICE
CERTIFICATE OF CORRECTION

PATENT NO. : 7,332,846 B2  Page 1 of 1
APPLICATION NO. : 11/005752
DATED : February 19, 2008
INVENTOR(S) : Wolfgang Hill It is certified that error appears in the above-identified patent and that said Letters Patent is hereby corrected as shown below:

On the title page item (73), should read:
Assignee: LuK Lamellen und Kupplungsbau Beteiligungs KG Signed and Sealed this Seventeenth Day of June, 2008

JON W. DUDAS
*Director of the United States Patent and Trademark Office*